United States Patent [19]

Kahley

[11] Patent Number: 4,966,460

[45] Date of Patent: Oct. 30, 1990

[54] LASER GAUGING OF ROTARY CUTTING TOOLS

[75] Inventor: Theodore E. Kahley, Rockford, Ill.

[73] Assignee: The Ingersoll Milling Machine Company, Rockford, Ill.

[21] Appl. No.: 369,043

[22] Filed: Jun. 20, 1989

Related U.S. Application Data

[63] Continuation of Ser. No. 114,195, Oct. 28, 1987, abandoned, which is a continuation-in-part of Ser. No. 91,533, Aug. 31, 1987, abandoned.

[51] Int. Cl.$^5$ ................. G01B 11/10; B23Q 17/24
[52] U.S. Cl. ........................................ 356/387; 408/16
[58] Field of Search ............... 356/375, 384, 385, 386, 356/387; 408/11, 16

[56] References Cited

U.S. PATENT DOCUMENTS

| | | | |
|---|---|---|---|
| 3,712,741 | 1/1973 | Revert | 356/387 |
| 3,795,449 | 3/1974 | McKay | 356/385 |
| 4,031,368 | 6/1977 | Colding et al. | 356/384 |
| 4,101,612 | 7/1978 | Banker et al. | 356/387 |
| 4,118,139 | 10/1978 | Lemelson | 408/12 |
| 4,461,576 | 7/1984 | King | 356/375 |
| 4,507,834 | 4/1985 | Chen et al. | 408/16 |
| 4,676,648 | 6/1987 | Schulz et al. | 356/385 |

FOREIGN PATENT DOCUMENTS

| | | | |
|---|---|---|---|
| 211654 | 2/1987 | European Pat. Off. | 356/386 |
| 14902 | 2/1981 | Japan | 356/375 |

Primary Examiner—Richard A. Rosenberger
Attorney, Agent, or Firm—Fitch, Even, Tabin & Flannery

[57] ABSTRACT

A laser-optical gauging system is disclosed for measuring the diameter of the cutting path of a rotary cutting tool while rotating in the machine spindle at speeds approximating the desired cutting speed for the intended cut, and for determining the axial location of the tip of a tool.

12 Claims, 9 Drawing Sheets

LASER GAUGING OF ROTARY CUTTING TOOLS

This application is a continuation of application Ser. No. 114,195 filed Oct. 28, 1987, which is a continuation-in-part of application Ser. No. 091,533 filed Aug. 31, 1987, both now abandoned.

This invention relates to boring and milling, and particularly to the gauging of boring tools and milling cutters while being rotated in order to determine as accurately as possible the actual location of the cutting path of the tool.

BACKGROUND OF THE INVENTION

It is common experience that holes bored using single point boring tools are sized after the fact, which is merely to acknowledge that it has heretofore been impossible to set the cutting point of a boring tool in such a way as to pre-size the resulting hole accurately.

In any boring operation there are typically a number of essentially indeterminate factors which play a part in determining the size of the hole produced, irrespective of the machinist's skill in setting the effective cutting radius of the tool. Prominent factors include the deflection of the boring bar under load, and the deflection or spring back of the workpiece itself, both of which may vary with the material and hardness of the workpiece, with the velocity and depth of cut, and with the feed rate of the boring-tool. High-speed, high-load boring operations also experience the dimensional effects of elevated temperatures in both the tool and the work, and the centrifugal forces acting on the tool, particularly on longer tool bars. In repetitive operations, the wear on the tool point also becomes a factor.

In practice, therefore, accurate boring, i.e., boring to close tolerances, has been a process of cut and try, out of which boring machine operators evolved the practice of taking a fairly heavy rough cut to remove, say, 80 percent of the metal to be removed in finally sizing the hole, whether a previously unmachined cored bore in a casting or a pre-drilled hole in a steel weldment or the like, followed by a semi-finish cut aimed at removing another 15 percent of the material. Experience with the behavior of a given tool, whether cantilevered from the spindle or supported as an arbor in an outrigger bearing, afforded the operator little more than a basis for predicting a probable result which had to be verified after the semi-finish cut by measurement of the bore before proceeding further.

This process of cut and measure was then repeated, again based upon the experience and skill of the machinist in predicting the behavior of the tool and the workpiece in determining the amount of metal that could safely be removed in a third and subsequent cuts, in which it was not possible to predetermine with accuracy the precise radial position of the tool point while rotating, nor its radial deflection under load.

Precision boring operations in these circumstances required consummate skill on the part of the operator in determining the amount of metal which could be removed in a given pass of the single-point tool through the workpiece, while the necessity of approaching a final result by decreasing increments inevitably left the operator with a choice between too large or too small, or, chance aside, multiplied drastically the machining time as the machinist engaged in a progressive reduction of the depth of successive cuts to hold tolerance.

This situation, to the extent dependent upon knowing the precise radial location of the rotating cutting tip of the boring tool, is magnified in the unmanned, more-or-less universal machine tools called "machining centers", i.e., tools which are adapted for milling, drilling, tapping, boring, counterboring, and spot facing, according to the nature of the particular tool mounted in the machine spindle. A complex total machining operation of that kind necessarily involves the automatic change of tools from operation to operation, with each tool presented successively to the spindle of the machine, in which it is typically centered by the seating of a taper on the tool holder in a corresponding taper in the spindle, and where a tool gripper associated with the spindle engages a knob on the tool holder to draw the tool into secure driving engagement with the spindle.

The automatic transfer of tools between the spindle of the machine and the storage pockets of an automatic tool changer or back-up tool reserve inevitably exposes the seating tapers of the tool holders to wear and tear, as well as to the accumulation of foreign material which interferes with the accurate centering of the tool holder as it is drawn tightly into the tapered seat of the spindle. In these circumstances, the accuracy of any pre-setting of the tool point of a boring tool is illusory, and the actual radial location of the tool point is difficult, if not impossible, to determine except from its effect upon the workpiece after the fact.

Rotary cutting tools of almost any nature which are coupled with the machine spindle in the manner described are susceptible to the same difficulty of achieving precise coaxial alignment with the machine spindle when considered in the context of maintaining close tolerances in a finish cut. In the case of a milling cutter, any deviation from precise alignment coaxially with the machine spindle will result in runout of the cutter, which, as a result of its eccentricity with the spindle, will cut to a depth, or in the case of an end-mill, to a shoulder as well as depth, which will deviate from that designed into the operation by the programmed movement of the machine spindle along and transversely of its own axis.

Touch probe systems are available for determining the axial or radial location or dimension of the tip of a boring tool or of the cutting path of a milling cutter under static conditions, i.e., by presenting the non-rotating spindle-mounted tool to a so-called tool datumming touch probe such as that available from Reneshaw, Inc., but such measurements performed with the tool at rest are unable to determine the location and effective radius of the cutting tool under the effect of centrifugal forces, which can be substantial at higher cutting speeds and of magnified effect in tools of substantial axial length, and, in the case of a radially adjustable boring bar, at the upper radial limits of tool adjustment.

It is an object of this invention to overcome much of the aforedescribed limitation upon the metal cutting art by providing an apparatus and method for unmanned determination of the exact radial extent and axial location of the cutting path of a rotating cutting tool so as to eliminate that major indeterminate factor from automated machining operation.

SUMMARY OF THE INVENTION

In accordance with the present invention, a boring mill or equivalent machining center is provided adjacent the working zone of the spindle with a laser beam scanner to which the rotating tool may be presented while rotating the spindle at a speed at or near cutting speed, selected in relation to the scanning frequency to assure the accuracy of its determination of the precise radial position of the rotating tool point. This accurate on-machine gauging of tool size eliminates from the boring operation a major indeterminate which has heretofore characterized that operation, and makes possible the attainment of repeatably accurate boring in automated machining operations.

The arrangement will similarly measure the diameter of the cutting path of a milling cutter, thereby to detect any misalignment of cutting inserts in the cutter body, or runout of the cutter if not aligned coaxially with the spindle. With judicious reorientation of the scanning plane, the laser scanner will also locate the axial extremity of the cutting path of a milling cutter, which is important to face milling as well as end milling.

BRIEF DESCRIPTION OF THE DRAWINGS

The accomplishment of the object of the invention will be appreciated from the following description of a preferred embodiment illustrated in the accompanying drawings in which.

DETAILED DESCRIPTION OF THE PREFERRED EMBODIMENT

Figure 1:
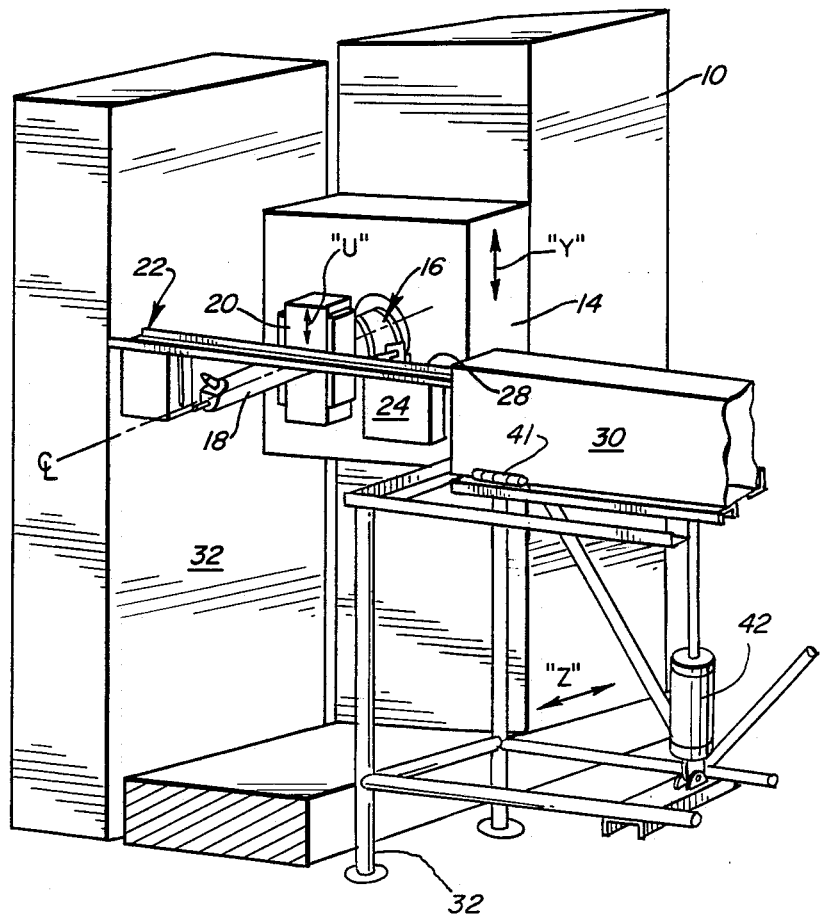
FIG. 1 is a diagrammatic perspective view of a horizontal spindle machining center having mounted therein an adjustable boring bar presented to a laser scan gauge mounted in association with the machine.

Referring initially to FIG. 1 of the drawings, the boring mill or machining center to which the invention is adaptable is there illustrated as a portion of a minimally four-axis machine in which the machine column 10 is supported upon a bed 12 for controlled movement in the direction of the axis of the machine spindle on the so-called Z-axis, and the spindle head 14 containing the machine spindle 16 may be raised or lowered on the machine column in the vertical or Y-axis direction. The swing of the single-point boring tool 18 mounted in an adjustable tool holder 20 in the spindle may be adjusted by a so-called U-axis drive involving cooperable mechanism in both the spindle head and the tool holder. Omitted from FIG. 1 as unnecessary to an explanation of the invention are a worktable supported on the machine bed 12 for linear movement horizontally in a direction perpendicular to the spindle axis, providing the fourth or X-axis of the machine, for a minimum of four axes of controlled relative movement of the tool point and the workpiece for the guidance of the tool therein while engaged in its cutting action by the rotation of the spindle.

It will be understood that motion on the automatically controlled axes of such a machining center while engaged in a boring operation is limited essentially to the Z-axis movement of the tool and workpiece relative to each other, the other axes of movement being essentially for other machining operations, and for positioning between operations.

In a milling operation, conversely, Z-axis movement is used essentially to set the axial depth of cut, and to a lesser extent for plunge cutting with end mills, with the feeding of the tool for the cutting action occurring along one or more of the other two rectilinear axes.

Mounted in fixed spatial relation to the bed of the machine is the laser gauging mechanism 22 by which the actual measurements involved in the method of the invention are carried out. The gauge comprises two active elements at the gauging site, viz., a laser transmitter or scanner 24, which, for most measurements, projects a laser beam in a plane perpendicular to the axis of the spindle 16 of the machine and moves the scanning beam perpendicularly to itself within the scanning plane by the rotation of motor-driven spinning mirrors within the transmitter 24. The other active element of the gauge is the receiver 26, which is co-positioned with the laser transmitter to position its elongated light-sensitive photodiode to detect so much of the scanning beam as is not obstructed by a tool positioned to interrupt the moving laser beam in the scanning field. The third basic element of the laser scanning mechanism itself is an electronic coupler, not shown, which contains the motor drive circuits for control of the scanning beam and its scanning frequency, measuring circuits for the sensing of the time durations of the impingement of the moving scanning beam upon the light-sensitive receiver, and a central processing unit (CPU) with associated electronic circuitry for converting the time elapsed between edge-detection signals into linear measurements, as later explained.

The scanning mechanism itself is not a part of the present invention, being known commercially as the Zygo laser telemetric measuring system, available from the Zygo Corporation of Middlefield, Conn.

To facilitate the presentation of the gauging mechanism 22 to the rotating boring tool 18, its transmitter 24 and receiver 26 are mounted in alignment upon a movable rail 28 upon which they are normally stored in a housing 30 positioned relatively high at one side of the machine, from which the gauging mechanism may be extended to position the sensing gap between the transmitter and the receiver so as to straddle the axis of the spindle 16, i.e., so that with the rail 28 extended from the housing 30, the machine spindle 16 by Y-axis movement can be elevated to position a cutting tool in the spindle so as to be inserted into and withdrawn from the scanning plane of the gauging mechanism by appropriate Z-axis movement of the machine column 10.

In the prototype mechanism developed for the practice of the invention, the farthest extended element is the receiver, and that closest to the housing which normally encloses and protects the gauging mechanism when not in use is the laser beam transmitter. The rail 28 is cantilevered from its movable support within the housing 30, and the support frame 32 of the gauge mechanism housing 30 is preferably independent of the bed 12 of the machine to insulate the gauging mechanism from vibration while in operation.

Figure 2:
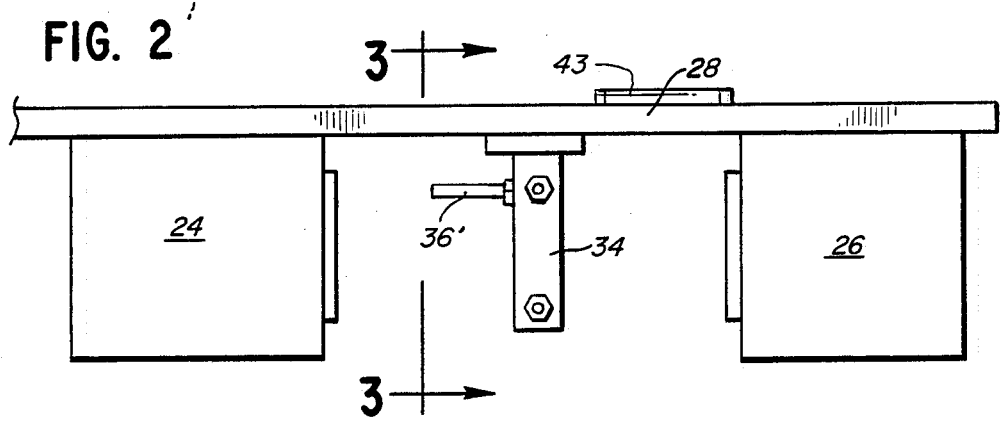
FIG. 2 is an enlarged diagrammatic elevational view of the laser scanner itself.

Also mounted upon the rail 28 between the transmitter and receiver is a depending post 34 (not seen in FIG. 1; see FIG. 2) having a pair of spaced pins 36 and 38 protruding therefrom into the scanning plane 40 to provide a scan-limiting mask to determine precisely the length of scan of the laser beam in the measurements to be taken. The pins themselves are ground and firmly secured in their mounting post 34, which in turn is firmly secured to the mounting rail 28 of the retractable gauging mechanism.

To adapt the scanning mechanism for determining the exact axial location of the tip of a milling cutter, the laser housing 30 is hinged at 41 on its support frame 32 for rocking movement through 90° to rotate the scanning plane 40 into parallelism with the spindle axis rather than transverse to that axis. See FIG. 3. A double-acting fluid power cylinder 42, controlled remotely by a solenoid operated valve, rocks the housing between its two positions on its base. As one of the techniques for that measurement, later to be described, utilizes only the equivalent of the upper masking pin 36, the pin 38 must be removed or retracted, as by making the supporting post 34 rotatable through a quarter turn on its own axis to remove both pins 36 and 38 from the scanning plane while presenting a single "upper" pin 36' in lieu thereof. A small cylinder 43, of the kind used to rock the entire housing 30 and slaved thereto, is connected to an arm secured to the post 34 above the rail 28, and alternates the masking pins as the entire mechanism is rocked about the hinges 42. As the function of the masking pins 36, 36' and 38 is simply to give precise definition to the edge of the scanning range in the area of the tool to be measured, it is anticipated that improvement of scanning lasers generally may in time obviate any need for any mask near the tool.

THE ACTUAL MEASUREMENT

Figure 4:
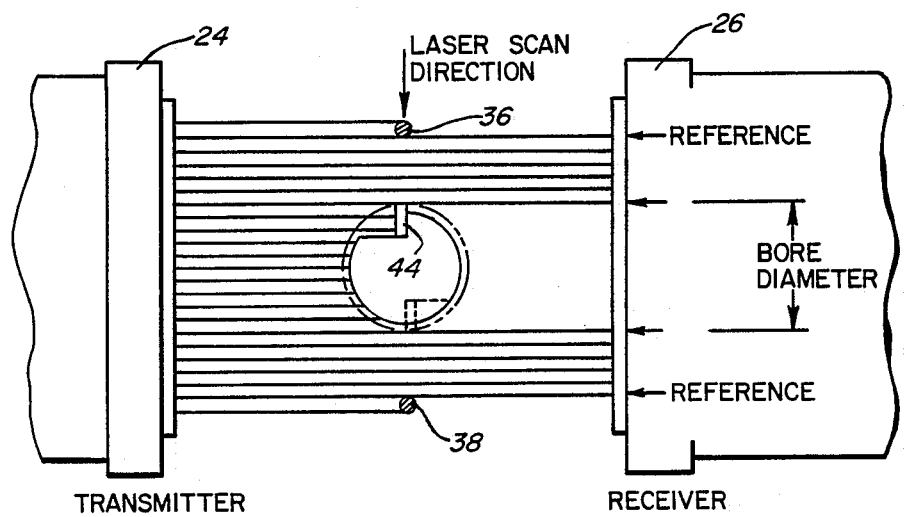
FIG. 4 is a diagram indicating the gauging of a boring or milling tool of fixed swing radius, or, in any event, one whose swing radius is within the physical limits of the scanning range of the gauge.

The measurement technique for the simplest case may best be described in connection with FIG. 4 in which the laser transmitter is depicted on the left, the receiver on the right, and the direction of scan vertically downward as represented by successive parallel lines extending between the transmitter and receiver in FIG. 4. The case depicted in FIG. 4 is referred to as the simplest case because the diameter of the cutting path of the tool or tool point 44 is less than the maximum length of scan.

Inasmuch as linear measurement by this technique is derived from the elapsed time between the initial impingement of the light beam upon the photodiode and its subsequent disappearance as the light beam is interrupted by an opaque object in its path, the scanning field is preferably masked to provide precise limits, in this case provided by the two pins 36 and 38 supported by the depending post on the support rail of the gauging mechanism, these pins being of sufficient length to break the scanning beam at the beginning and the end of each scan.

In the measuring technique, the precise distance between the masking pins 36 and 38 is determined as the first step of the measurement, after which the cutting tool is brought up to a speed approximating cutting speed and then inserted to break the scanning plane 40 by a very slow axial movement of the cutting tool by movement of the machine column on the Z-axis. The slow movement of the Z-axis is to make sure that the radially extreme tip of the tool point has broken the scanning plane for a sufficient length of time to obtain an accurate measurement.

The measurement actually performed by the apparatus is the elapsed time between the appearance of the scanning beam from behind the upper edge-limiting masking pin 36 until the beam is again masked by the tool point 44 of the boring bar in its top dead-center position, after which the re-appearance of the beam below the cutting blade in its bottom dead-center position is again detected by the receiver which remains energized until the scanning beam is again masked by the lower edge-limiting masking pin 38. By the summation of the measured distances between the upper masking pin and the tool point at top dead center with the distance between the tool point at bottom dead center and the lower masking pin, and their subtraction from the previously measured distance between the two edge-limiting masking pins 36 and 38, the diameter of the cutting path of the tool point is derived.

In the prototype measuring apparatus of the invention, the Zygo laser transmitter scans at a frequency of 120 Hz or 7,200 scans per minute. In order, therefore, to avoid a stroboscopic stoppage of the image of the tool point as it is being gauged, the spindle is rotated in the cutting direction of the tool at an asynchronous speed which, for convenience, may be determined by taking the whole number factorial of 7,200 which is closest to the desired cutting speed, and preferably adding a small number of rpms, for example seven. This provides an asynchronous mixed-number ratio between the scanning frequency and the rotational tool speed to assure that the image of the tool point on successive scans moves slowly enough through dead center to be measured a sufficient number of times for an accurate maximum. For example, for a desired cutting speed of, say, 300 rpm, the actual spindle speed would be set at 307 rpm to assure that the tool point was "caught" at both top and bottom dead center within a limited scanning period of, say, from 15 to 30 seconds duration. The same technique may be used to check runout of any milling cutter capable of being accommodated within the scanning range determined by the masking pins 36 and 38.

Figure 5:
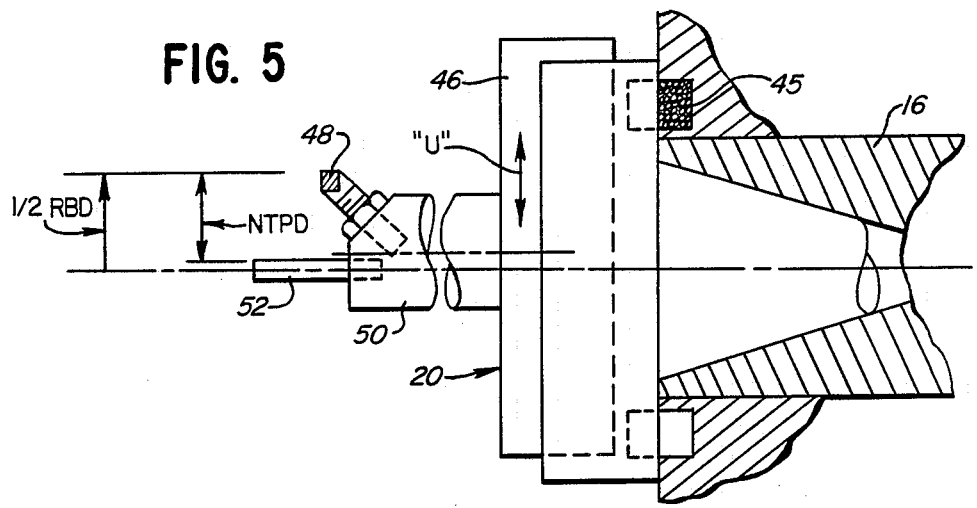
FIG. 5 is an enlarged diagrammatic cross-sectional view of the adjustable boring tool of FIG. 1 as mounted in the spindle of the machine.
Figure 6:
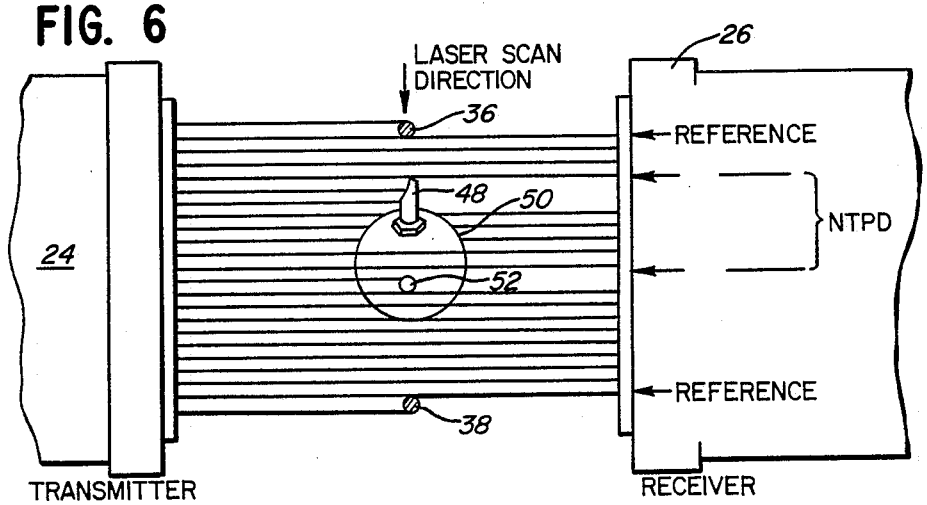
FIGS. 6 and 7 are diagrams of a gauging setup for adjustable boring tools, viewed axially of the boring tool and spindle.
Figure 7:
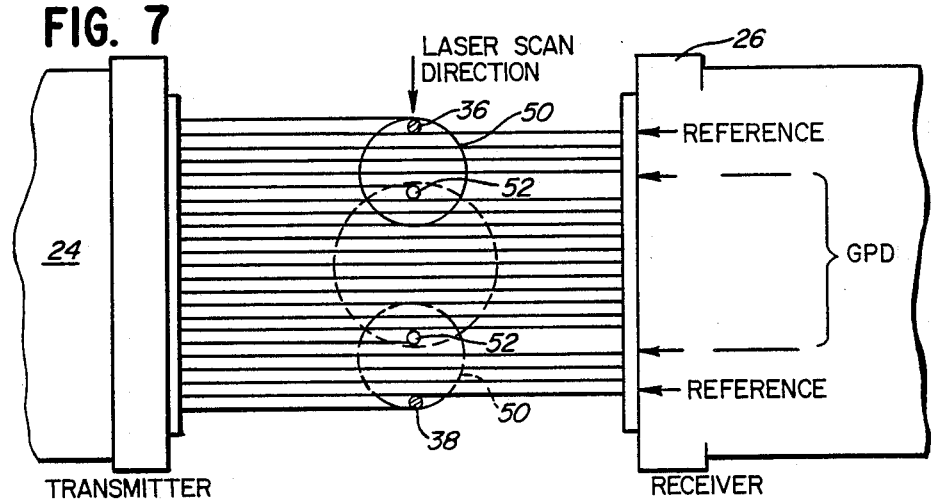

Because of the limited extent of the length of scan of the available equipment, at approximately four inches, which is further limited by edge-limiting masking pins 36 and 38, it is necessary to devise an alternate technique for the gauging of boring tools for boring larger diameters, and that technique is illustrated in FIGS. 5, 6, and 7.

FIG. 5 shows somewhat diagrammatically the adjustable tool carrier 20 mounted in the spindle 16 of the machine and engaged with the drive key 45 of the so-called U-axis drive which, by separately driven rotation relative to the spindle, operates drive gearing and ultimately an adjustment screw within the tool carrier 20 to extend or retract the movable portion 46 thereof in the radial direction so as to change the radius of the tool point 48 on a boring bar 50 mounted in the movable portion 46 of the carrier. Such carriers typically have multiple sockets for the receipt of the boring bar in order to cover a substantial range of hole sizes to be bored.

Therefore, when hole sizes exceed the scanning range of available equipment, an alternate technique, illustrated in FIGS. 6 and 7, is employed for the measurement of the cutting diameter of the tool in increments.

For the measurement of tools of diameters larger than the scanning range of the machine, the boring bar (FIG. 5) is provided at its free end with a protruding gauge pin 52 which is preferably ground precisely cylindrical and inserted into a receiving hole in the end of the boring bar 50, not necessarily in the center thereof, but with the axis of the pin aligned with the tool point 48 on a common diameter of the bar so that both are aligned, along with the movable part 46 of the tool carrier, on a diameter of the spindle.

As a first step after the re-measurement of the distance between the masking pins 36 and 38, the boring bar 50 is advanced on the Z-axis so that the gauge pin 52, which extends substantially beyond the cutting plane of the tool point 48 and the plane of the tool point itself, intercepts the scanning plane. The tool bar is oscillated slowly as the Z-axis movement walks the tool point slowly through the scanning plane, e.g., at 0.05 inches per minute for one minute, resulting in the measurement of the distance (NTPD) between the tool point and the top edge of the gauge pin in the same manner described in connection with the simple case, with the central processing unit associated with the gauging equipment continuously measuring and storing the greatest dimension obtained from the tip of the boring tool to the top of the gauge pin.

When that measurement is completed, the boring bar is retracted along the Z-axis to clear the gauge pin from the masking pins, run up to cutting speed, or, as previously described, at a speed nearest the desired cutting speed which is a near factorial of the scanning frequency. The spindle head 14 is then positioned along the Y-axis to center the spindle axis vertically in the scanning plane and then advanced along the Z-axis until the rotating gauge pin breaks the scanning plane, where it pauses while rotating for the 15 to 30 seconds required to measure the diameter of the path described by the gauge pin (GPD).

Using this technique, the summation of the measured diameter of the gauge pin path (GPD) plus twice the measured cutting tip to gauge pin distance provides the measured diameter of the rotating tool point for comparison with the programmed diameter of the cut. If it is out of tolerance and adjustment of the tool point is needed, it is accomplished by control of the U-axis, after which the diameter of the gauge pin path (GPD) is again measured to determine mathematically whether the adjustment of the tool point was effective to bring its cutting path diameter (RBD) within tolerance.

Figure 3:
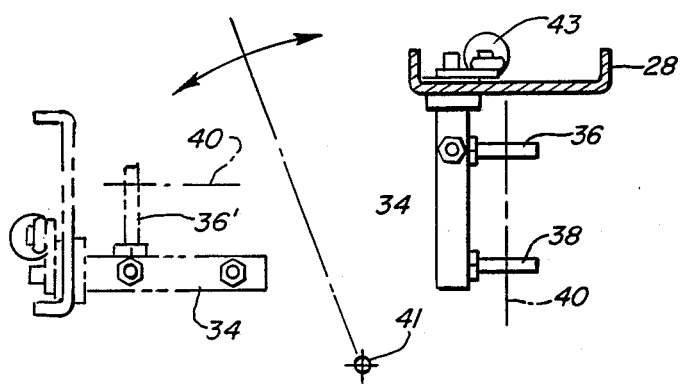
FIG. 3 is a view taken on line 3—3 of FIG. 2.

To check a milling cutter for length after insertion into the spindle, the gauge mechanism is rocked to its alternate position shown in broken lines in FIG. 3, and the height of the spindle readjusted by Y-axis movement to position the cutter to intercept the scanning plane 40 of the instrument, now positioned horizontally in the alternate position of the mechanism. The spindle is then advanced by Z-axis movement to position the tip of the milling cutter at a predetermined nominal location in the scanning plane. With the alternate "top" pin 36' now upstanding vertically through the horizontally positioned scanning plane, scanning proceeds in the direction from the pin 36' toward the spindle, and measures the distance from the pin 36' to the tip of the milling cutter, using an alternate protocol provided by the central processing unit of the laser instrument itself.

PROGRAMS FOR AUTOMATED GAUGING

The division of control of the foregoing operations between the overall computer numerical control (CNC), the microprocessor unit (CPU) which forms part of the actual gauging mechanism, and the machine interfacing microcomputer (MIC) which actually performs the summation calculations, is best explained by reference to the flow diagrams of FIGS. 8 and 9, which illustrate, respectively, the inserted programming of the overall CNC part program for the manufacture of the workpiece, and the programming of the machine interface computer.

Figure 8A:
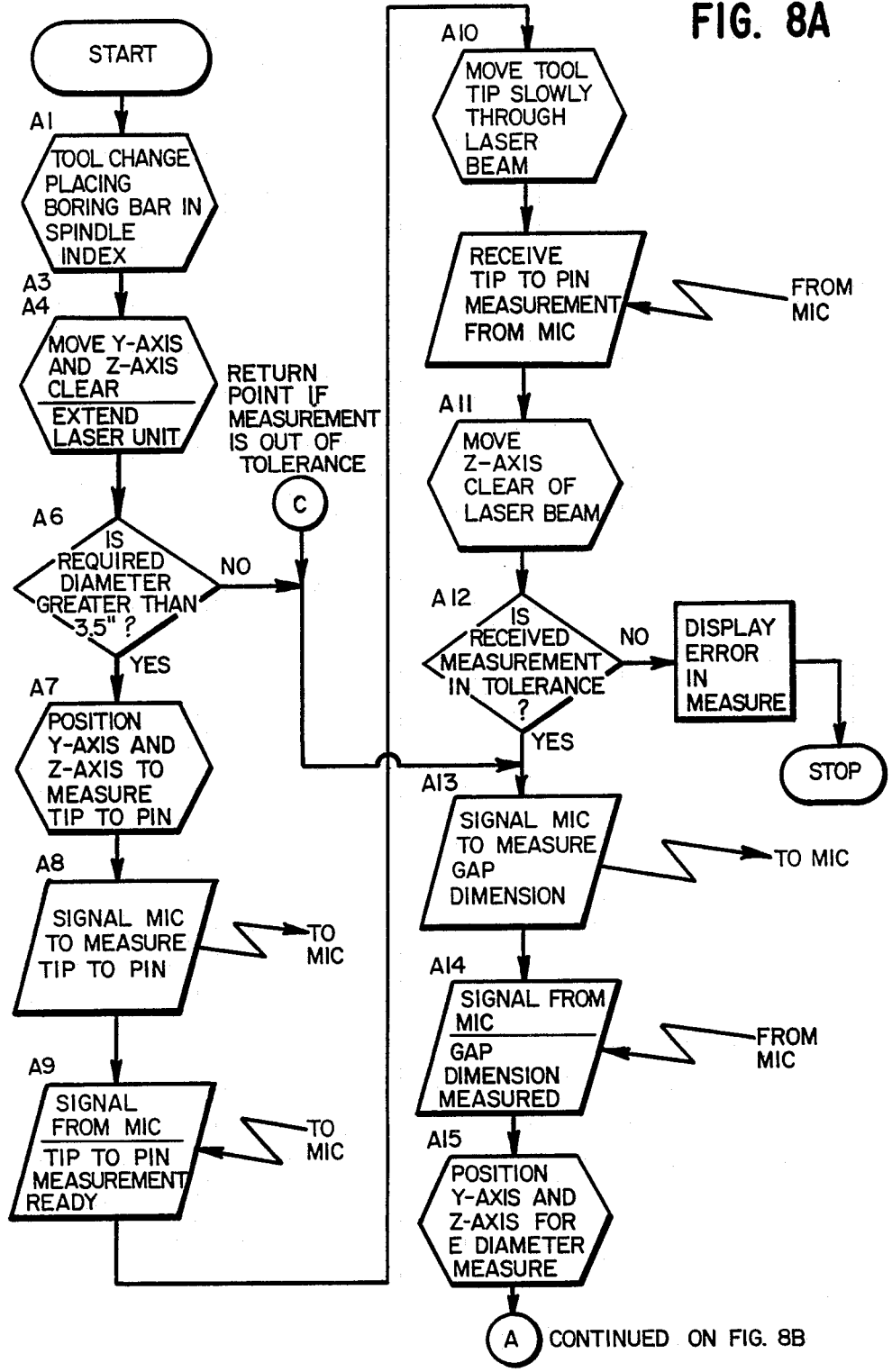
FIGS. 8A, 8B, and 8C collectively constitute a flow diagram of a program insert for the part program of a computer numerical control (CNC) to condition the machining center and an associated machine interfacing microcomputer for the automatic gauging of cutting tools as part of the part program of the workpiece to be machined.
Figure 8B:
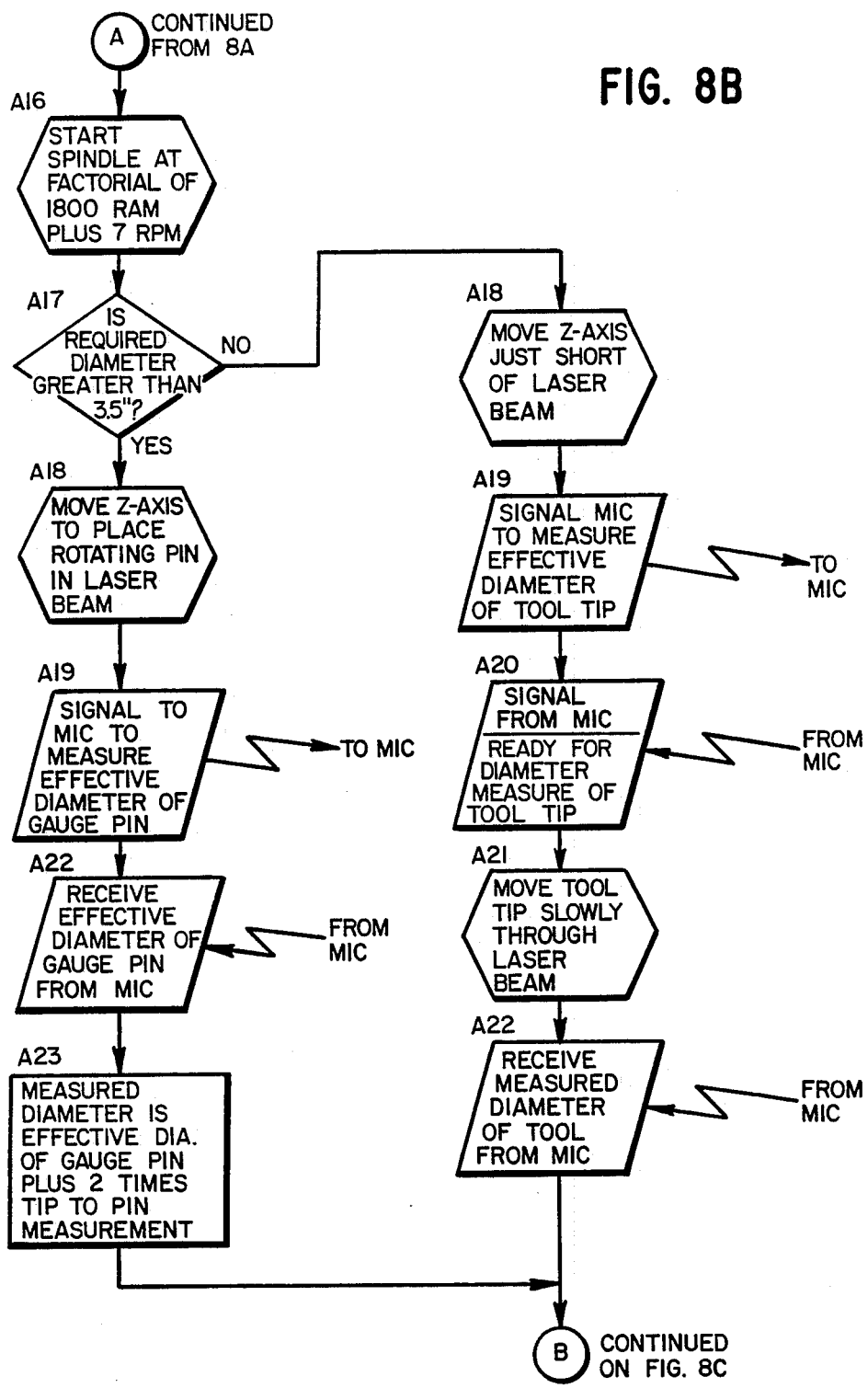
Figure 8C:
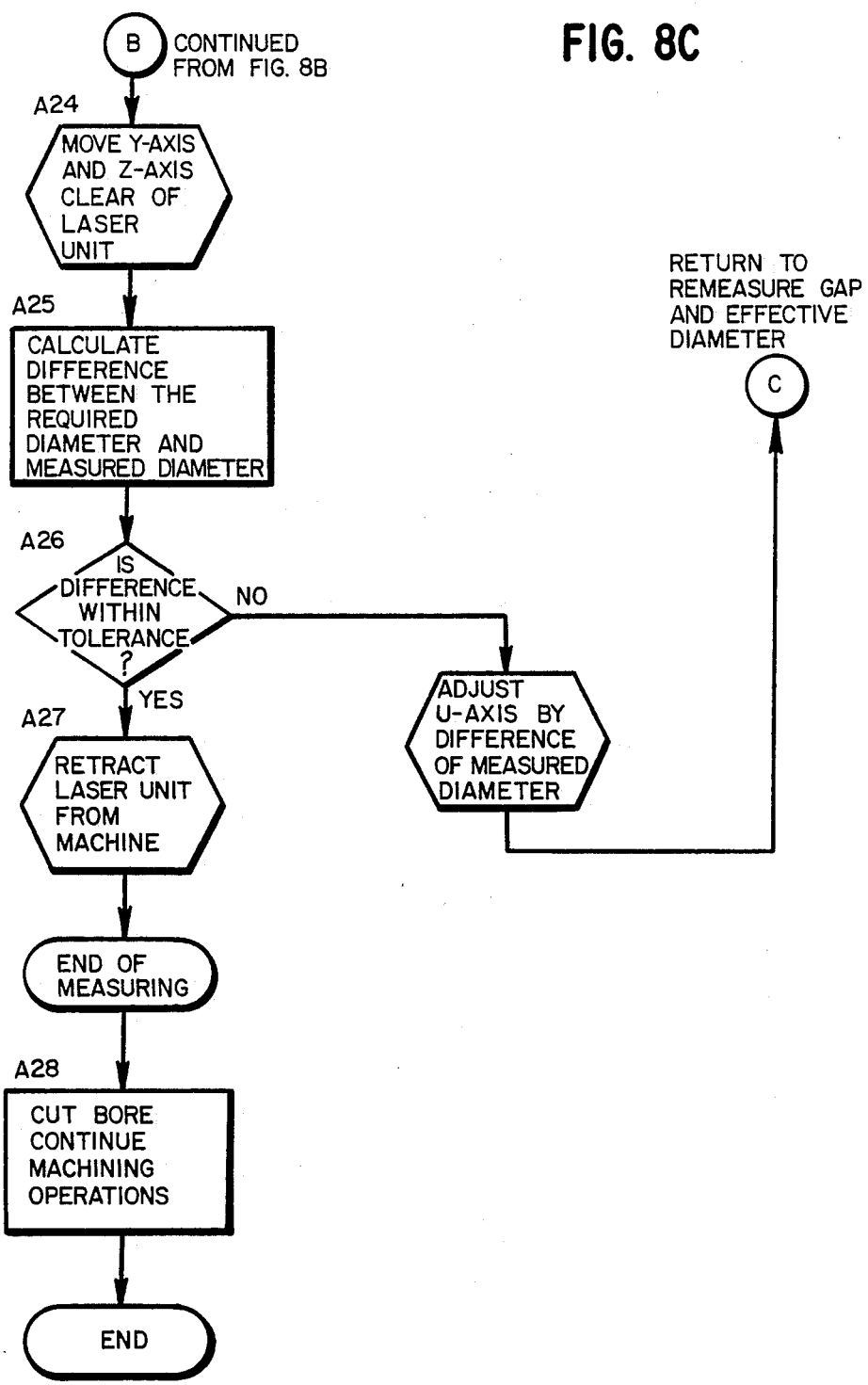
Figure 9A:
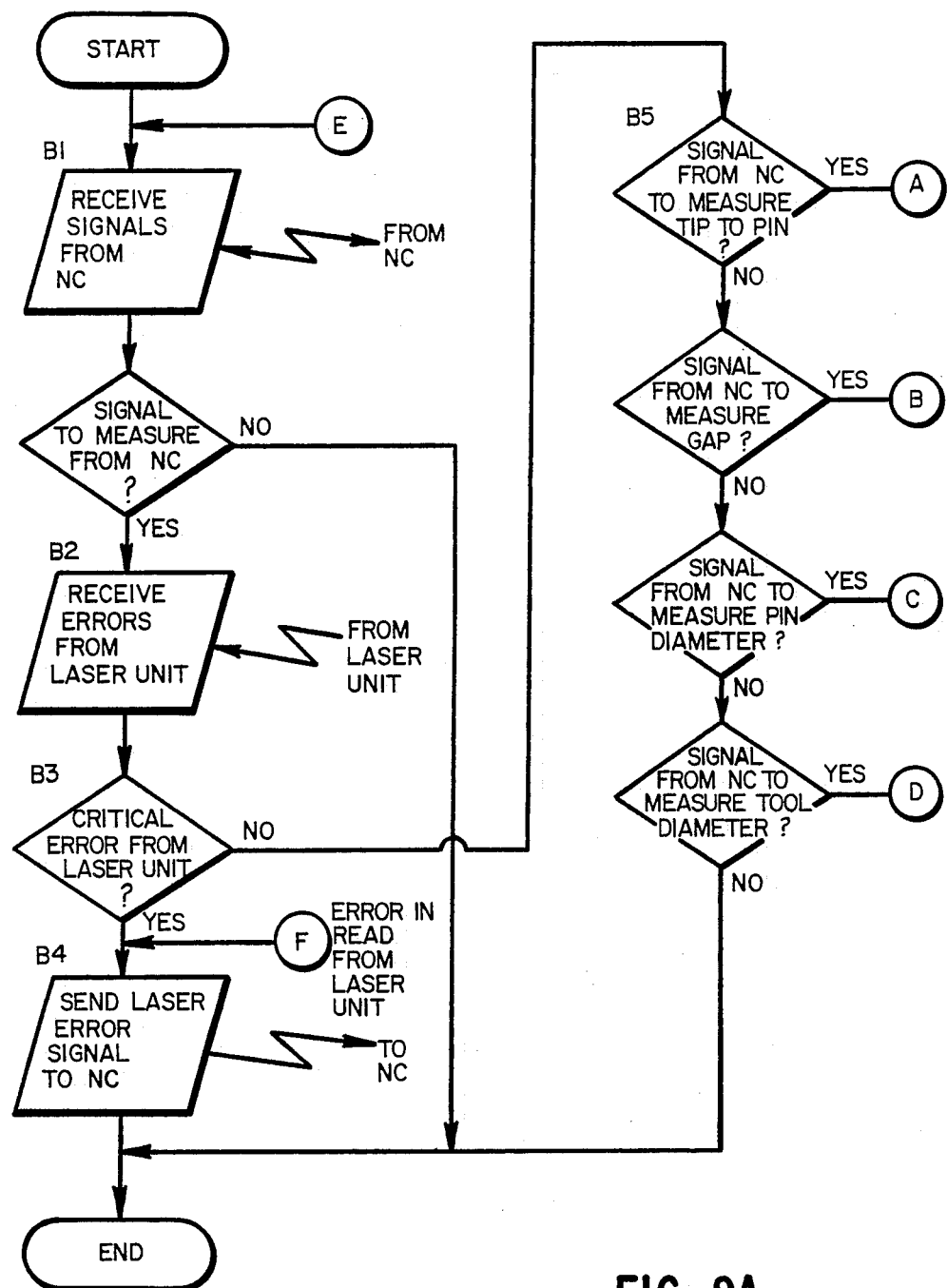
FIGS. 9A, 9B, and 9C collectively constitute a flow diagram of the program of the aforementioned microcomputer forming part of the control of the gauging apparatus.
Figure 9B:
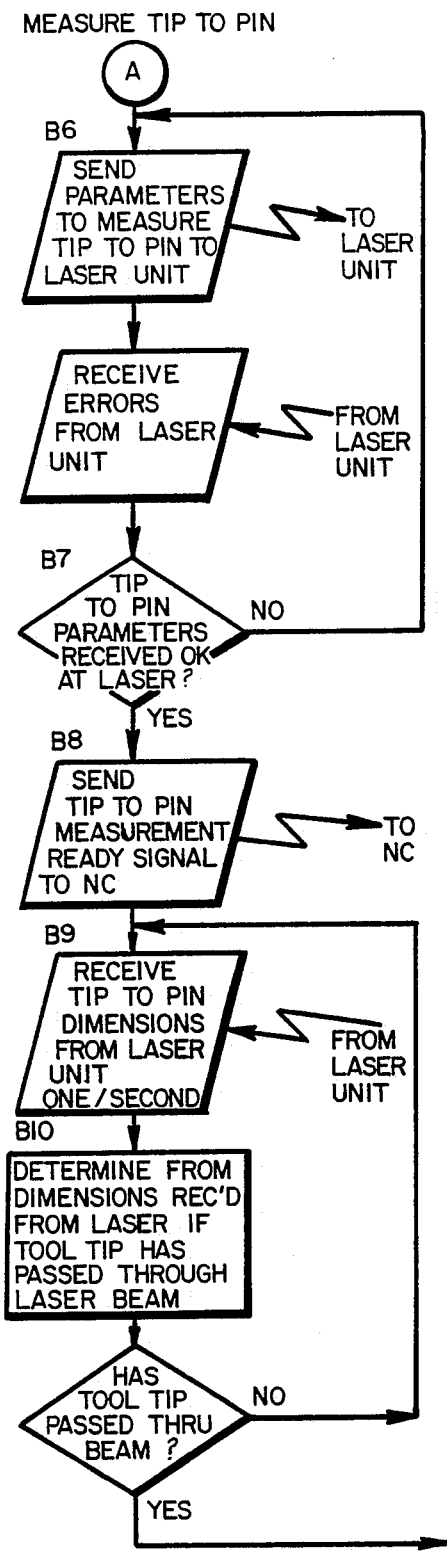
Figure 9B:
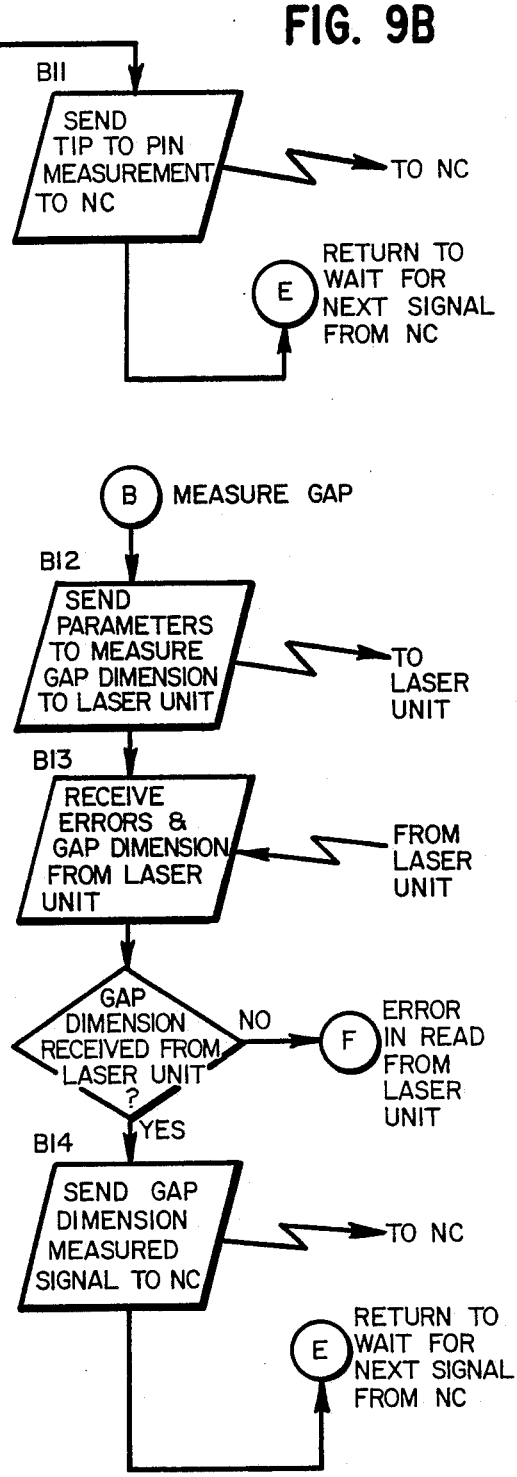
Figure 9C:
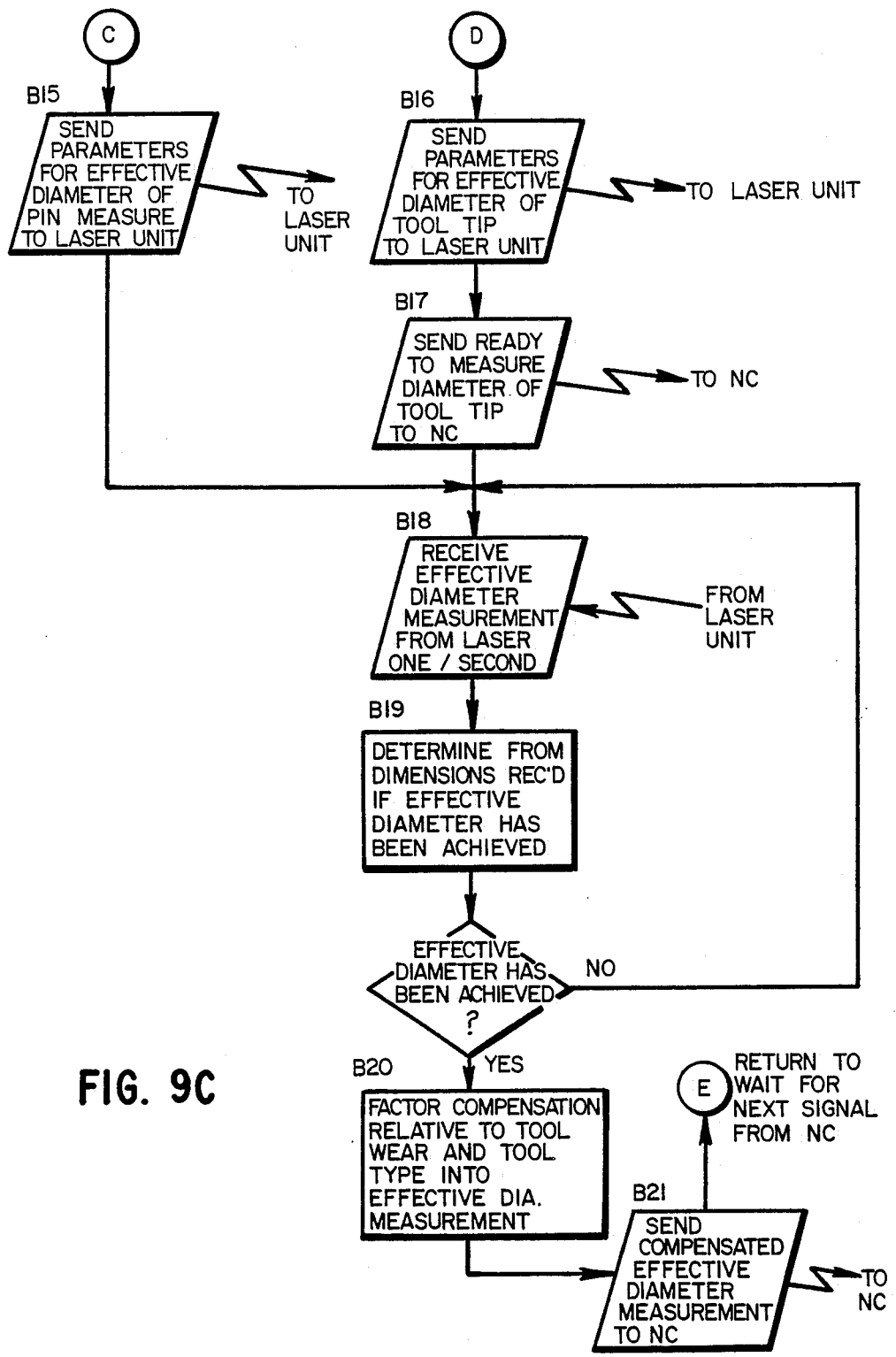

Referring to FIGS. 8A, 8B, and 8C, which show the flow chart for the insert to the part program of the CNC, the following steps are performed in carrying out the actual measurement of the tool, those steps embodying in part, as indicated in the following description, related operations of the machine interface computer (MIC), and the CPU of the laser gauge, as indicated in the detailed step-by-step description which follows.

A.1 The CNC program, prior to machining an accurate bore, will request a tool change to the proper boring attachment. The previous tool (if any) will be placed back into the magazine and the boring attachment placed in the spindle. The Y- and Z-axes will remain in the tool change position. During the process of changing the tools, the spindle will be oriented, indexed to a position allowing for tool change, and will remain in this position until a program block calls for a spindle start in either the CW or CCW direction. At this position a boring bar attachment axis (U-axis) will be vertical in the spindle.

A.2 The next action of the program will be to define the required diameter of bore to be machined (RBD), the spindle rotational speed and direction at which the bore will be machined (SRPM and SDIR), and store the number of the boring tool which is used (BTLN). For example, assume boring tool T451501 is used for a 4.375 inch bore at 320 rpm.

A.3 The U-axis is moved to the required position within the CNC program, based on the value of the required bore diameter (RBD), and the Y- and Z-axes are moved to a position clear of the laser unit.

A.4 The CNC program will then signal the laser unit slide 28 to extend from its "house" 30 and prevents further cycling of the CNC program until the laser unit 22 is fully extended into position in front of the machine column (FIG. 1).

A.5 Values are stored corresponding to the tool selected which define the nominal tool length (NTL) and the nominal tip-to-pin dimension (NTPD) of the tool that is selected. For example, assume that boring tool number T451501 has a nominal length of 8.534 inches, and a nominal tip-to-pin dimension of 1.375 inches.

A.6 The CNC program will then examine the required bore diameter (RBD) to see if it is greater than 3.5 inches, and if it is, the CNC program will perform the following steps, otherwise the program sequence will jump to section B.11 (FIG. 9), which begins the measurement of the gap dimension, i.e., the distance between pins 36 and 38.

A.7 The bore diameter being greater than 3.5 inches, the CNC program will determine the position of the Y- and Z-axes in which to measure the boring bar tool tip-to-gauge pin, and then move the two axes just shy of the positions. These positions are calculated from the constant position of the laser unit, and the values stored as required bore diameter (RBD), nominal tool length (NTL), and nominal tip-to-pin dimension (NTPD). The calculations are as follows, assuming that the center of the laser scanning beam is 60.5 inches above the workpiece table and that the laser beam is 68.0 inches from the center of the workpiece table.

$$Y\text{-pos.} = 60.5 - ((RBD-NTPD)/2)$$

$$Z\text{-pos.} = 68.0 + NTL + 0.75$$

A.8 The CNC program will, after moving into position, signal the MIC to begin a "tip-to-pin" measuring cycle.

A.9 The CNC program will not proceed until the MIC has successfully downloaded parameters for the tip-to-pin measuring cycle to the laser unit, and responded with a signal that the system is ready to begin the tip-to-pin measuring cycle.

A.10 The boring bar will then be moved through the laser scanning beam very slowly, allowing the laser unit to read and retain the maximum dimension measured from the gauge pin to tool tip of the boring bar. The Z-axis will move the tool through the beam at 0.05 inches per minute, over a distance of 0.05 inches. The laser unit is measuring the tip-to-pin dimension during this move, which will take one minute, and sending the measurements to the MIC. The CNC program will determine, at the end of the motion, if a measurement has been received from the MIC. (The MIC must send back the measured tip-to-pin dimension to the CNC before completion of this move.)

A.11 The program will then move the Z-axis back to the position indicated in section A.7, clear of the laser beam.

A.12 The CNC program will then flag an error if the tip-to-pin measurement was received incorrectly, or not received at all, and stop processing this cycle. If a correct tip-to-pin measurement has been received from the MIC, the program will store this value (TPM) and continue to measure the gap dimension. For this example, assume that the measurement received was 1.379 inches; 0.004 inches larger than the nominal tip-to-pin dimension (NTP), stored in section A.5.

A.13 This is the point at which the macro program will jump, if the required bore diameter is less than 3.5 inches, from section A.6, and also from section A.26 to re-measure the effective diameter after compensating the U-axis for an out-of-tolerance tool diameter. The program then signals the MIC to download parameters to the laser unit requiring measurement of the gap dimension.

A.14 The CNC program will not proceed until the MIC has successfully downloaded parameters for the laser unit to measure the gap dimension of the gauge mask, and responded with a signal that the gap dimension has been obtained by the MIC. (This dimension is not used by the CNC program at all, but is only required by the MIC during the "effective diameter" parameter downloading.)

A.15 The CNC program will then move the Y- and Z-axes into position before beginning an effective diameter measurement, with the spindle centerline at the center of the laser scanning beam.

A.16 The value saved in section A.2 for the required bore spindle speed (SRPM) determines the gauging spindle speed (GRPM) for the effective diameter measurement function. The GRPM is calculated as the closest factorial of 7,200, plus 7 rpm, with the maximum value derived being 907 rpm. The GRPM is determined by the following set of conditional statements in the CNC program. The program will then start the spindle at the GRPM speed to measure the effective diameter.

GRPM = 907 rpm
If SRPM is less than 750 rpm then GRPM = 607 rpm
If SRPM is less than 525 rpm then GRPM = 457 rpm
If SRPM is less than 405 rpm then GRPM = 367 rpm
If SRPM is less than 330 rpm then GRPM = 307 rpm
If SRPM is less than 262 rpm then GRPM = 232 rpm
If SRPM is less than 187 rpm then GRPM = 157 rpm
If SRPM is less than 125 rpm then GRPM = 107 rpm.

In the example of section A.2, the GRPM will be set to 307 rpm.

A.17 In the following six steps, the sequence of events within the CNC program is dependent on whether the required bore diameter is greater or less than 3.5 inches, and the effective diameter measurement is of the tool tip diameter or the gauge pin diameter.

A.18 The Y-axis and the Z-axis are positioned to begin measuring of the effective diameter. If the required diameter is greater than 3.5 inches, only the gauge pin of the tool is located within the laser beam. If the required diameter is less than 3.5 inches, the tool tip is located just outside the laser beam. In either case, note that the spindle is running at the GRPM speed, and that the spindle centerline is positioned at the center of the laser field.

A.19 The program then signals the MIC to download parameters to the laser unit requiring the measurement of the effective diameter of the tool. Since there are different parameters required for measurement of the gauge pin and the tool tip, one of two signals are sent indicating which parameters are to be downloaded.

A.20 If the signal to measure the tool tip for a diameter of less than 3.5 inches is received by the MIC, and the appropriate parameters are subsequently downloaded to the laser unit, the MIC will then send a signal back to the CNC, indicating that the system is ready to measure the tool tip effective diameter. If the tool diameter is greater than 3.5 inches, the measurements of the gauge pin will be received immediately following the parameter downloads.

A.21 If the tool tip is being measured for a diameter less than 3.5 inches, the CNC program will move the tool tip slowly through the laser beam (in the same manner as the tip-to-pin measurement) until the MIC has determined that the effective diameter of the tool tip has been obtained. In the case of measuring the gauge pin diameter, the tool is not moved through the beam and the effective diameter of the rotating pin is obtained with the Z-axis held stationary.

A.22 When the MIC determines that the effective diameter for either the tool tip or gauge pin has been obtained, the effective diameter is sent to the CNC, which receives the dimension in the same manner for either case.

A.23 If the system is measuring the effective diameter of the gauge pin, the CNC program then adds the effective diameter received (MEFD) to twice the measured tip-to-pin (TPM) received in section A.12. Otherwise, the effective diameter received is the tool effective diameter (TEF). The calculation in the CNC is:

$$TEF = (2 \times TPM) + MEFD \text{ [bores greater than 3.5']}$$

or

TEF=MEFD [bores less than 3.5′]

A.24 After the effective diameter is received from the MIC, the CNC program will move the Y-axis and the Z-axis clear of the laser unit.

A.25 The CNC program will then subtract the measured effective diameter (MEFD), obtained from A.23, from the required bore diameter (RBD) defined in section A.2 to determine the difference between the two.

A.26 The difference determined in A.25 is examined to see if the measured effective diameter is within a tolerance, specific to the system, of the required diameter. If the difference is out-of-tolerance, the U-axis (boring tool) is adjusted for the difference and the effective diameter is re-measured by the program looping back to section A.13.

A.27 When the measured effective diameter (MEFD) is found to be within tolerance, either on the first pass through the CNC program or after adjustment is made in section A.26, and successive loop(s) through the program are made to position the boring tool within tolerance, the laser unit is retracted from the machine, and the measuring and adjustment sequence is complete.

A.28 The CNC axes are then moved into position to cut the required bore, except for the U-axis, which is held in position at the measured diameter. Following the machining of the bore diameter, other machining operations may be performed, such as milling, drilling, tapping, etc. However, prior to machining another accurate bore, the tolerances specified by the system will probably require that the measuring and adjustment sequence be performed again, because tool wear and/or inaccuracy of the U-axis, tool slide, will not maintain the bore diameter within tolerance through two successive bores.

B.1 The MIC program (FIG. 9) is relatively dormant except when a boring tool measuring and adjustment sequence is initiated by a signal from the CNC, otherwise the MIC program simply "waits" until a signal from the CNC is received. The sequence of measuring cycles is irrelevant to the MIC at any point in time, and measurements occur solely on the signals received from the CNC.

B.2 When a signal to measure is received from the CNC (from section A.8, A.13 or A.19), the port to the laser unit is "opened" by sending a request for some irrelevant data to the laser unit. The request answered with any errors that exist will be received by the MIC.

B.3 The MIC will analyze the errors (if any) received from the laser unit to determine if any of them are critical to the operation of the system. No receipt of the requested data also constitutes a critical error, indicating that the communication port is not operational.

B.4 If a critical error exists, a signal indicating this is sent to the CNC to be displayed to the operator, and to halt the measuring sequence. (This is not indicated in the CNC program description.) Both the MIC program and the CNC program will not continue until the error is corrected.

B.5 Assuming that no critical errors exist, the measuring signal from the CNC is analyzed to determine which of the four measuring cycles is being requested from the CNC. For each signal, the MIC program branches to accomplish the measurement of the particular sequence requested. A measurement of tip-to-pin branches to section B.6, a measurement of gap dimension branches to section B.12, a measurement of effective diameter of the tool gauge pin branches to section B.15, and a measurement of effective diameter of the tool tip branches to section B.16.

B.6 When a measurement of the tool tip-to-gauge pin is requested from the CNC, the MIC program sends a command string to the laser unit CPU to measure the distance from the top of the gauge pin to the tool tip as the tool is moved through the laser beam, and to retain and send the maximum dimension recorded to the MIC, with the current measurements of the tool tip-to-pin. At this point in time, the tool is not placed in the laser beam (see sections A.7 and A.8) and an error from the laser unit will be received indicating this.

B.7 An error may also be received indicating that the command was not properly received or processed by the laser unit, in which case, the MIC program will re-transmit the command to the laser unit CPU.

B.8 When the laser CPU has processed the command and indicates that the tool is not yet in the laser beam, the MIC program will send a signal to the CNC program indicating that the laser unit is ready for the tip-to-pin measurement, and the CNC program starts moving the tool tip slowly through the laser beam (see sections A.9 and A.10).

B.9 As the tool tip passes through the laser beam, the laser unit will send the measured tip-to-pin dimension, and the accumulated maximum dimension each second.

B.10 The MIC program will monitor the tip-to-pin dimensions and the maximum dimension received over a period of time to determine when the tool tip has passed through the laser beam. The measurements received reveal the tool geometry, and the tool tip-to-pin dimension can be determined from these measurements.

B.11 When the tool tip-to-gauge pin is determined from B.10, the maximum dimension, retained from the tool tip as it passes through the beam, is sent to the CNC program, signaling the end of the tip-to-pin measuring cycle (see Section A.10). The MIC program will then loop back to B.1 to wait for the next measurement signal from the CNC, which will normally be the gap dimension measuring cycle.

B.12 When the MIC receives a request to measure the gap dimension from the CNC, the MIC program will send a command string to the laser unit to measure the gap dimension of the laser beam mask. In the meantime, the CNC has cleared the tool from the laser beam for this measurement to take place, unobstructed.

B.13 The laser beam gauge mask dimension is received from the laser unit and checked to see if the dimension is correct within a tolerance band, indicating that correct measurement is received, or, if errors are received, they are analyzed to determine possible causes of the errors. If the measurement is wrong or an error exists, the program loops to section B.4 and the measurement sequence is halted.

B.14 If the gap measurement received is "good," the MIC program sends a signal to the CNC indicating the measurement is taken and the CNC program continues (see section A.14). The gap measurement is stored in the MIC for future use in an effective diameter measurement, and is not sent to or required by the CNC program. The MIC program then loops back to section B.1 and waits for the next measurement request signal from the CNC, which will normally be one of the two effective diameter measurements.

B.15 When the MIC receives a request to measure the effective diameter of the tool gauge pin from the CNC, a command string is sent to the laser unit for this measurement. The command string contains the gap dimension previously obtained and stored in sections B.13 and B.14. Note here that the tool gauge pin is already in the laser beam and rotating at the correct spindle RPM from sections A.18 and A.19. The MIC program will then jump to section B.18 to process either of these two effective diameter measurements.

B.16 When the MIC receives a request to measure the effective diameter of the tool tip from the CNC, a command string is sent to the laser unit for this measurement. The command string contains the gap dimension previously obtained and stored in sections B.13 and B.14, and other parameters allowing the measurement of a rotating tool tip which may pass out of the laser beam or have an unclear "edge" while rotating. Note here that the tool is located outside the laser beam and the CNC program is waiting for a signal to proceed (see sections A.18 and A.20).

B.17 After the command string is sent to the laser unit, the MIC program then sends a signal to the CNC indicating that the laser unit is ready to measure the effective diameter of the tool tip. This allows the CNC program to continue and slowly move the tool tip through the laser beam in the same manner as in the tip-to-pin measuring sequence (see section A.21).

B.18 In either of the two effective diameter measurements, the laser unit sends an effective diameter of the rotating tool tip or gauge pin to the MIC each second. The measurements from the laser unit are calculated as the maximum displacement of the tool through the laser beam, on each scan of the laser. The maximum measurement is retained through each laser scanning cycle within the laser unit, until the effective diameter is obtained, or the unit is reset. By the parameters described in section A.16, the effective diameter is obtained after 15 to 20 seconds from the first measurement recorded. The retained measurement is sent to the MIC once every second while the measurements are being processed in the laser unit, even during the first 15 seconds.

B.19 If the effective diameter of the gauge pin is being measured, the effective diameter is received and the laser system is reset for the effective diameter to be processed again. If the effective diameter of the tool tip is being measured, the laser system is reset in sync with the tool motion through the laser beam. In either case, the resetting and re-measuring is done three times and averaged for the final effective diameter measurement.

B.20 The MIC program will then draw on a data bank of factors that affect the differences between the measured diameter and an actual bore diameter produced with the U-axis position constant These factors are tool deflection, amount of tool wear determined by past use of the tool, specific tool geometry, etc. These factors are then added to or subtracted from the final effective diameter measurement obtained in section B.19.

B.21 The final effective diameter, compensated with the factors described in B.20, are then sent to the CNC program to determine if U-axis adjustment is necessary, and the MIC program loops back to section B.1 to wait for the start of another measuring sequence.

It will be apparent from the foregoing description that the accurate sizing of bores in an automated machining operation is dependent upon tool gauging at or near cutting speeds, and that effective gauging of the rotating tool by the optical laser technique disclosed requires in turn the rotation of the tool at speeds asynchronous to the scanning frequency of the laser transmitter employed.

What is claimed is:

1. Apparatus for gauging a rotary cutting tool while rotating in the spindle of a machine tool, comprising:
   a transmitter for producing a scanning laser beam movable perpendicularly of itself in a scanning plane through a predetermined scanning range at a predetermined velocity and with a scanning frequency which is a substantial mixed number multiple of the rotational frequency of the tool chosen to rotate the image of the tool slowly relative to the scanning frequency,
   a light-sensing receiver positioned to detect the impingement of the moving laser beam thereupon,
   means for positioning said transmitter and receiver on opposite sides of the spindle axis and with the cutting tool breaking the scanning plane within said scanning range,
   means for slowly moving the cutting tool axially through the scanning plane to assure the exposure of the cutting tip of the cutter to the scanning beam, and
   means for measuring the minimum elapsed time of the sensed impingement of the scanning laser upon the receiver during multiple successive scans of the laser beam between an edge of the scanning range and the nearest encountered point of said tool as a measure of the distance between said edge and said nearest point.

2. The apparatus of claim 1 employed to gauge the cutting diameter of said cutting tool wherein the cutting diameter of the tool is less than said scanning range, said scanning plane is positioned normal to the spindle axis and coincident with the plane of rotation of the cutting tool at its maximum cutting diameter, and
   the elapsed time measured occurs between each edge of the scanning range and said cutting tool, as a measure of the maximum cutting diameter.

3. The apparatus of claim 2 employed for gauging the swing of the cutting point of a boring tool, wherein said maximum diameter is the diameter of the plane of rotation of the cutting point of the tool.

4. The apparatus of claim 2 wherein the edges of said scanning range are predetermined by two spaced obstructions in the path of the laser beam to the receiver.

5. The apparatus of claim 1 further adapted to gauge the diameter of the cutting path of a boring tool whose cutting point is carried by a tool bar mounted in a radially-adjustable slide movable to a cutting path diameter greater than the predetermined scanning range of the laser beam,
   said bar having at its free end a reference pin projecting parallel to the spindle axis with its center aligned with the cutting point on a diameter of the spindle being axially movable by the tool bar into the scanning plane at a turning radius enabling it to turn within said scanning range,
   said reference pin having a known radial distance from said cutting point whereby the lasermeasured diameter of the path of the reference pin becomes an indirect measure of the diameter of the cutting path.

6. The apparatus of claim 1 employed for gauging the axial location of the tip of a cutting tool wherein said scanning plane is parallel to the axis of the spindle and said laser beam scans from said edge to the tip of the cutting tool.

7. The apparatus of claim 1 wherein said transmitter and receiver are rotatable to position said scanning plane perpendicular or parallel, respectively, to said spindle axis.

8. The method of gauging a cutting tool in the spindle of a machine tool while the cutting tool is rotating, comprising the steps of rotating the spindle at desired cutting speed, positioning the rotating tool within the predetermined scanning range of a laser beam movable perpendicularly of itself in a scanning plane at a predetermined velocity with a scanning frequency which bears a mixed number ratio to the rotational speed of the tool, chosen to rotate the image of the tool slowly relative to the scanning frequency, slowly moving the cutting tool axially through the scanning plane to assure the exposure of the cutting tip of the cutter to the scanning beam, and measuring the minimum elapsed time for the traverse of the laser beam between an edge of its predetermined range and the nearest point of the tool during multiple successive scans as a measurement of the distance between said edge and said nearest point.

9. The method of claim 8 applied to measure the diameter of the cutting path of a cutting tool wherein the scanning plane is positioned normal to the spindle axis at the maximum cutting diameter of the cutting tool, and the said minimum elapsed time measured is that which occurs upon the traverse of the laser beam between each edge of the predetermined range and the cutting tool at said maximum cutting diameter.

10. The method of claim 9 applied to measure the diameter of a boring tool wherein said maximum diameter is the diameter of the path of the cutting point of the tool.

11. The method of claim 9 applied to the measurement of the diameter of the cutting path of a boring tool which is adjustable to a cutting diameter greater than said scanning range by radial movement of the boring bar relative to the spindle axis, comprising the preliminary steps of providing the boring bar at its free end with a reference pin projecting therefrom parallel to the axis of the spindle and beyond the cutting plane of the tool point with the axis of said pin and the tool point aligned on a diameter of the machine spindle, and measuring the distance between said tool point and said reference pin along said spindle diameter before rotating the spindle at desired boring speed, then positioning the rotating tool to cause only the reference pin to penetrate said scanning plane while rotating the tool and measuring the diameter of the path of the reference pin as specified for measuring the diameter of cutting path of the tool of claim 9, and summing twice said measured tool-point-to-reference-pin distance with the diameter of the path of the reference pin to obtain the rotational diameter of the tool point.

12. The method of claim 11 wherein said tool-point-to-reference-pin distance is also laser-measured separately by positioning the boring bar to position both the tool point and the reference pin within said scanning range and said scanning plane of the laser beam with the tool point at or near dead center, and oscillating the spindle slowly through a limited arc to both sides of dead center during multiple successive scans of the laser beam while measuring the maximum elapsed time for the traverse of the laser beam between the tool point and reference pin as a measure of the tool-point-to-reference-pin distance.

* * * * *

UNITED STATES PATENT AND TRADEMARK OFFICE
CERTIFICATE OF CORRECTION

PATENT NO. : 4,966,460

DATED : October 30, 1990

INVENTOR(S) : Theodore E. Kahley

It is certified that error appears in the above-identified patent and that said Letters Patent is hereby corrected as shown below:

Column 10, line 68, change "3.5'" to --3.5"--.

Column 11, line 3, change "3.5'" to --3.5"--.

Signed and Sealed this

Seventeenth Day of March, 1992

Attest:

HARRY F. MANBECK, JR.

*Attesting Officer*     *Commissioner of Patents and Trademarks*